United States Patent
Akel et al.

(10) Patent No.: US 11,565,792 B2
(45) Date of Patent: Jan. 31, 2023

(54) METHODS AND SYSTEMS FOR DEPLOYING ADJACENT TRAILING EDGE FLAPS

(71) Applicant: BOMBARDIER INC., Dorval (CA)

(72) Inventors: Iyad Akel, Laval (CA); Dmitry Budnitsky, Ancaster (CA); Howard Ian Smith, Niagara Falls (CA); Thomas Hanson, Ballwin, MO (US)

(73) Assignee: BOMBARDIER INC., Dorval (CA)

( * ) Notice: Subject to any disclaimer, the term of this patent is extended or adjusted under 35 U.S.C. 154(b) by 97 days.

(21) Appl. No.: 17/236,097

(22) Filed: Apr. 21, 2021

(65) Prior Publication Data

US 2021/0237855 A1 Aug. 5, 2021

Related U.S. Application Data

(63) Continuation of application No. 16/311,356, filed as application No. PCT/US2017/039541 on Jun. 27, 2017, now Pat. No. 11,014,649.

(60) Provisional application No. 62/356,278, filed on Jun. 29, 2016.

(51) Int. Cl.
*B64C 13/16* (2006.01)
*B64C 13/24* (2006.01)
(Continued)

(52) U.S. Cl.
CPC ............... *B64C 13/16* (2013.01); *B64C 9/16* (2013.01); *B64C 9/20* (2013.01); *B64C 13/24* (2013.01); *B64C 13/26* (2013.01)

(58) Field of Classification Search
CPC .. B64C 13/16; B64C 9/16; B64C 9/20; B64C 13/24; B64C 13/26; Y02T 50/10; Y02T 50/30; Y02T 50/40
See application file for complete search history.

(56) References Cited

U.S. PATENT DOCUMENTS 3,897,029 A 7/1975 Calderon
4,353,517 A * 10/1982 Rudolph .................. B64C 9/20
244/216
(Continued)

FOREIGN PATENT DOCUMENTS

WO 2013006340 A1 1/2013

OTHER PUBLICATIONS

International Searching Authority, PCT International Search Report & Written Opinion dated Oct. 26, 2017, re: International Patent Application No. PCT/US2017/039541.
(Continued)

*Primary Examiner* — Marthe Y Marc-Coleman
(74) *Attorney, Agent, or Firm* — Norton Rose Fulbright Canada LLP

(57) ABSTRACT

Systems and methods for deploying adjacent trailing edge flaps that are part of different flap assemblies of different stiffnesses are disclosed. An exemplary method comprises: deploying a first flap of a first flap assembly having a first stiffness by a first deployment amount and deploying a second flap adjacent the first flap by a second deployment amount where the deployment amount of the first flap part of the flap assembly of lower stiffness is greater than the second deployment amount of the second flap part of the flap assembly of higher stiffness. The difference in deployment amounts may be adapted to improve continuity between the first flap and the second flap when the first and second flaps are deployed and subjected to an aerodynamic load.

18 Claims, 9 Drawing Sheets

(51) Int. Cl.
    *B64C 9/16*          (2006.01)
    *B64C 9/20*          (2006.01)
    *B64C 13/26*        (2006.01)

(56) References Cited

U.S. PATENT DOCUMENTS

| | | |
|---|---|---|
| 4,784,355 A | 11/1988 | Brine |
| 5,702,072 A | 12/1997 | Nusbaum |
| 6,601,801 B1 * | 8/2003 | Prow .................. B64C 9/02 |
| | | 244/216 |
| 7,048,228 B2 | 5/2006 | Vassberg et al. |
| 8,584,991 B2 * | 11/2013 | Schlipf .................. B64C 13/28 |
| | | 244/215 |
| 8,876,065 B2 | 11/2014 | Grieco et al. |
| 9,550,559 B1 | 1/2017 | Droney |
| 2006/0038086 A1 | 2/2006 | Reckzeh |
| 2011/0127387 A1 | 6/2011 | Morris |
| 2012/0153086 A1 | 6/2012 | Khorrami |

OTHER PUBLICATIONS

Eggink et al., 747-8 Offers Operational Improvements and Cross-Model Commonality, http://www.boeing.com/commercial/aeromagazine/articles/2010_q3/2, 2010.
Flight International, Bombardier Global 5000, https://www.flightglobal.com/assets/getAsset.aspx?ItemID=25468, accessed on Apr. 25, 2016.
Rudolph, High-Lift Systems on Commercial Subsonic Airliners, NASA Contractor Report 4746, Sep. 1996.

* cited by examiner

800

```
┌─────────────────────────────────────────────────────────────┐
│ DEPLOYING A FIRST FLAP OF A FIRST FLAP ASSEMBLY HAVING A    │
│ LOWER STIFFNESS TO A FIRST DEPLOYED POSITION.               │
│                            802                              │
└─────────────────────────────────────────────────────────────┘
                               │
                               ▼
┌─────────────────────────────────────────────────────────────┐
│ DEPLOYING AN ADJACENT SECOND FLAP OF A SECOND FLAP          │
│ ASSEMBLY HAVING A HIGHER STIFFNESS TO A SECOND              │
│ DEPLOYED POSITION WHERE THE FIRST DEPLOYED POSITION OF      │
│ THE FIRST FLAP IS ADAPTED TO COMPENSATE FOR AN EXPECTED     │
│ DEFLECTION OF THE FIRST FLAP ASSEMBLY UNDER AN              │
│ AERODYNAMIC LOAD TO IMPROVE CONTINUITY BETWEEN THE          │
│ FIRST FLAP AND THE SECOND FLAP.                             │
│                            804                              │
└─────────────────────────────────────────────────────────────┘
```

FIG. 8

METHODS AND SYSTEMS FOR DEPLOYING ADJACENT TRAILING EDGE FLAPS

CROSS-REFERENCE TO RELATED APPLICATIONS

This application is a continuation of U.S. patent application Ser. No. 16/311,356 filed on Jun. 27, 2017 and incorporated herein by reference, which is a national phase application under 35 U.S.C. 371 of International Patent Application No. PCT/US2017/039541 filed on Jun. 27, 2017 and incorporated herein by reference, which claims priority from U.S. Provisional Patent Application Ser. No. 62/356,278, entitled "METHODS AND SYSTEMS FOR DEPLOYING ADJACENT TRAILING EDGE FLAPS," filed Jun. 29, 2016 and hereby incorporated by reference.

TECHNICAL FIELD

The disclosure relates generally to aircraft high-lift flight control surfaces, and more particularly to deploying adjacent trailing edge flaps of aircraft wings.

BACKGROUND OF THE ART

Flaps are a type of deployable high-lift device used to increase the lift of an aircraft wing at a given airspeed and are usually mounted at the trailing edge of a wing of a fixed-wing aircraft. Flaps can typically lower the minimum speed at which the aircraft can be safely flown. Flaps can also cause an increase in drag so they are typically retracted when not needed.

One common type of flap is the "double-slotted" type of flap that comprises a forward flap panel and an aft flap panel. The use of double-slotted flaps can require actuation mechanisms of increased complexity but the use of double-slotted flaps can nevertheless be desirable on some aircraft. On aircraft that have both double-slotted flaps and single-slotted flaps on the same wing, flap continuity in the spanwise direction of the wing is typically interrupted. Such interruption in spanwise flap continuity can reduce the effectiveness of the flaps.

SUMMARY

In one aspect, the disclosure describes a trailing edge flap system for a wing of an aircraft. The system comprises:
a first flap assembly including a first flap movably coupled to a structure of the aircraft wing, the first flap assembly having a first stiffness;
a second flap assembly including a second flap movably coupled to the structure of the aircraft wing, the second flap being disposed adjacent the first flap, the second flap assembly having a second stiffness, the first stiffness of the first flap assembly being lower than the second stiffness of the second flap assembly;
one or more data processors operatively coupled to cause deployment of the first flap and of the second flap; and
non-transitory machine-readable memory storing instructions executable by the one or more data processors and configured to cause the one or more data processors to:
using data representative of a flap deployment command, generate an output for causing deployment of the first flap by a first deployment amount and for causing deployment of the second flap by a second deployment amount where the first deployment amount of the first flap is greater than the second deployment amount of the second flap.

The greater first deployment amount may be adapted to at least partially compensate for a deflection of the first flap assembly relative to the second flap assembly when the first flap is deployed and subjected to an aerodynamic load.

A deployment difference between the first deployment amount and the second deployment amount may be adapted to improve continuity between the first flap and the second flap when the first flap and the second flap are deployed and subjected to an aerodynamic load.

The instructions may be configured to cause the one or more data processors to generate the output for causing simultaneous deployment of the first flap and second flap.

The first flap may be double-slotted and second flap may be single-slotted.

The first flap may be disposed inboard of the second flap relative to the aircraft wing.

An outboard edge of the first flap and an inboard edge of the second flap may be substantially parallel when the first flap and the second flap are substantially retracted.

A first trailing edge portion of the aircraft wing defined by the first flap may be non-parallel to a second trailing edge portion of the aircraft wing defined by the second flap.

The second flap may be configured for generally streamwise deployment relative to the aircraft wing.

The first flap assembly may comprise one or more first tracks for guiding the deployment of the first flap; and the second flap assembly may comprise one or more second tracks for guiding the deployment of the second flap where the one or more first tracks and the one or more second tracks are at least partially embedded in the first flap and second flap respectively.

The instructions may be configured to cause the one or more data processors to determine the first deployment amount of the first flap based on an operating parameter of the aircraft.

The instructions may be configured to cause the one or more data processors to determine the first deployment amount of the first flap based on an airspeed of the aircraft.

In another aspect, the disclosure describes a system for deploying adjacent trailing edge flaps movably coupled to an aircraft wing where the adjacent trailing edge flaps are part of different flap assemblies having different stiffnesses. The system comprises:
one or more data processors operatively coupled to cause deployment of a first flap and of a second flap where the first flap is adjacent the second flap and where the first flap is part of a first flap assembly having a first stiffness and the second flap is part of a second flap assembly having a second stiffness where the first stiffness of the first flap assembly is lower than the second stiffness of the second flap assembly; and non-transitory machine-readable memory storing instructions executable by the one or more data processors and configured to cause the one or more data processors to:
using data representative of a flap deployment command, generate an output for causing deployment of the first flap by a first deployment amount and for causing deployment of the second flap by a second deployment amount where the first deployment amount of the first flap is greater than the second deployment amount of the second flap.

The greater first deployment amount may be adapted to at least partially compensate for a deflection of the first flap assembly relative to the second flap assembly when the first flap is deployed and subjected to an aerodynamic load.

A deployment difference between the first deployment amount and the second deployment amount may be adapted to improve continuity between the first flap and the second flap when the first flap and the second flap are deployed and subjected to an aerodynamic load.

The instructions may be configured to cause the one or more data processors to generate the output for causing simultaneous deployment of the first flap and second flap.

The instructions may be configured to cause the one or more data processors to determine the first deployment amount of the first flap based on an operating parameter of the aircraft.

The instructions may be configured to cause the one or more data processors to determine the first deployment amount of the first flap based on an airspeed of the aircraft.

In another aspect, the disclosure describes a method for deploying adjacent trailing edge flaps movably coupled to an aircraft wing during flight where the adjacent trailing edge flaps are part of different flap assemblies having different stiffnesses. The method comprises:
  deploying a first flap of a first flap assembly having a first stiffness by a first deployment amount; and
  deploying a second flap adjacent the first flap by a second deployment amount, the second flap being part of a second flap assembly having a second stiffness, the first stiffness of the first flap assembly being lower than the second stiffness of the second flap assembly and the first deployment amount of the first flap being greater than the second deployment amount of the second flap.

The greater first deployment amount may be adapted to at least partially compensate for a deflection of the first flap assembly relative to the second flap assembly when the first flap is deployed and subjected to an aerodynamic load.

A deployment difference between the first deployment amount and the second deployment amount may be adapted to improve continuity between the first flap and the second flap when the first flap and the second flap are deployed and subjected to an aerodynamic load.

The first flap may be double-slotted and second flap may be single-slotted.

The first flap may be disposed inboard of the second flap relative to the aircraft wing.

An outboard edge of the first flap and an inboard edge of the second flap may be substantially parallel when the first flap and the second flap are substantially retracted.

A first trailing edge portion of the aircraft wing defined by the first flap may be non-parallel to a second trailing edge portion of the aircraft wing defined by the second flap.

The method may comprise deploying the second flap in a generally streamwise direction relative to the aircraft wing.

The method may comprise deploying the first flap and the second flap simultaneously.

The method may comprise determining the first deployment amount of the first flap based on an operating parameter of the aircraft.

The method may comprise determining the first deployment amount of the first flap based on an airspeed of the aircraft.

In another aspect, the disclosure describes a trailing edge flap system for a wing of an aircraft. The system comprises:
  a first flap assembly including a first flap movably coupled to a structure of the aircraft wing, the first flap assembly having a first stiffness, the first flap assembly being configured to guide the first flap to a first deployed position based on a flap deployment command; and
  a second flap assembly including a second flap movably coupled to the structure of the aircraft wing, the second flap being disposed adjacent the first flap, the second flap assembly having a second stiffness, the first stiffness of the first flap assembly being lower than the second stiffness of the second flap assembly, the second flap assembly being configured to guide the second flap to a second deployed position based on the flap deployment command, the first deployed position of the first flap being adapted to compensate for an expected deflection of the first flap assembly under an aerodynamic load to improve continuity between the first flap and the second flap when the first flap and the second flap are deployed based on the flap deployment command.

The first deployment position of the first flap may be adapted to compensate for different expected deflections of the first flap assembly and of the second flap assembly.

The first flap may be double-slotted and second flap may be single-slotted.

The first flap may be disposed inboard of the second flap relative to the aircraft wing.

An outboard edge of the first flap and an inboard edge of the second flap may be substantially parallel when the first flap and the second flap are substantially retracted.

A first trailing edge portion of the aircraft wing defined by the first flap may be non-parallel to a second trailing edge portion of the aircraft wing defined by the second flap.

The second flap may be configured for generally streamwise deployment relative to the aircraft wing.

The first flap assembly may comprise one or more first tracks for guiding the deployment of the first flap; and the second flap assembly may comprise one or more second tracks for guiding the deployment of the second flap where the one or more first tracks and the one or more second tracks are at least partially embedded in the first flap and second flap respectively.

In another aspect, the disclosure describes a method for deploying adjacent trailing edge flaps movably coupled to an aircraft wing during flight where the adjacent trailing edge flaps are part of different flap assemblies having different stiffnesses. The method comprises:
  deploying a first flap of a first flap assembly having a first stiffness to a first deployed position in response to a flap deployment command; and
  deploying a second flap adjacent the first flap to a second deployed position in response to the flap deployment command, the second flap being part of a second flap assembly having a second stiffness, the first stiffness of the first flap assembly being lower than the second stiffness of the second flap assembly and the first deployed position of the first flap being adapted to compensate for an expected deflection of the first flap assembly under an aerodynamic load to improve continuity between the first flap and the second flap when the first flap and the second flap are deployed in response to the flap deployment command.

The first deployment position of the first flap may be adapted to compensate for different expected deflections of the first flap assembly and of the second flap assembly.

The first flap may be double-slotted and second flap may be single-slotted.

The first flap may be disposed inboard of the second flap relative to the aircraft wing.

An outboard edge of the first flap and an inboard edge of the second flap may be substantially parallel when the first flap and the second flap are substantially retracted.

A first trailing edge portion of the aircraft wing defined by the first flap may be non-parallel to a second trailing edge portion of the aircraft wing defined by the second flap.

The method may comprise deploying the second flap in a generally streamwise direction relative to the aircraft wing.

The method may comprise determining the first deployment position of the first flap based on an operating parameter of the aircraft.

The method may comprise determining the first deployment position of the first flap based on an airspeed of the aircraft.

In another aspect, the disclosure describes a trailing edge assembly for an aircraft wing. The trailing edge assembly comprises:
- a double-slotted flap movably coupled to a structure of the aircraft wing, the double-slotted flap having an outboard edge; and
- a single-slotted flap movably coupled to the structure of the aircraft wing, the single-slotted flap being disposed outboard of the double-slotted flap and adjacent the double-slotted flap, the single-slotted flap having an inboard edge, the inboard edge of the single-slotted flap being substantially parallel to the outboard edge of the double-slotted flap when the double-slotted flap and the single-slotted flap are retracted.

A first trailing edge portion of the aircraft wing defined by the first flap may be non-parallel to a second trailing edge portion of the aircraft wing defined by the second flap.

The single-slotted flap may be configured for generally streamwise deployment relative to the aircraft wing.

The assembly may comprise:
- one or more first tracks for guiding the deployment of the double-slotted flap; and
- one or more second tracks for guiding the deployment of the single-slotted flap, the one or more first tracks and the one or more second tracks being at least partially embedded in the double-slotted flap and in the single-slotted flap respectively.

The double-slotted flap may be part of a first flap assembly having a first stiffness and the single-slotted flap may be part of a second flap assembly having a second stiffness. The first stiffness of the first flap assembly may be lower than the second stiffness of the second flap assembly.

In a further aspect, the disclosure describes an aircraft comprising a trailing edge flap system as disclosed herein.

In a further aspect, the disclosure describes an aircraft comprising an assembly as disclosed herein.

Further details of these and other aspects of the subject matter of this application will be apparent from the drawings and detailed description included below.

DESCRIPTION OF THE DRAWINGS

Reference is now made to the accompanying drawings, in which:

FIG. 8 is a flowchart illustrating another exemplary method for deploying adjacent trailing edge flaps of an aircraft wing.

DETAILED DESCRIPTION

The present disclosure relates to configurations of high-lift devices such as trailing edge flaps and also to systems and methods for actuating such trailing edge flaps. In some embodiments, the systems and methods disclosed herein may relate to the configuration and deployment of adjacent trailing edge flaps that are part of different assemblies having different stiffnesses in order to improve spanwise flap continuity. In some embodiments, the systems and methods disclosed herein may relate to the configuration and deployment of adjacent double-slotted flaps and single-slotted flaps that improve spanwise flap continuity. In some embodiments, the systems and methods disclosed herein may contribute toward improving the effectiveness of trailing edge flaps and toward wing constructions that promote efficiency and fuel economy of an aircraft.

Aspects of various embodiments are described through reference to the drawings.

Figure 1:
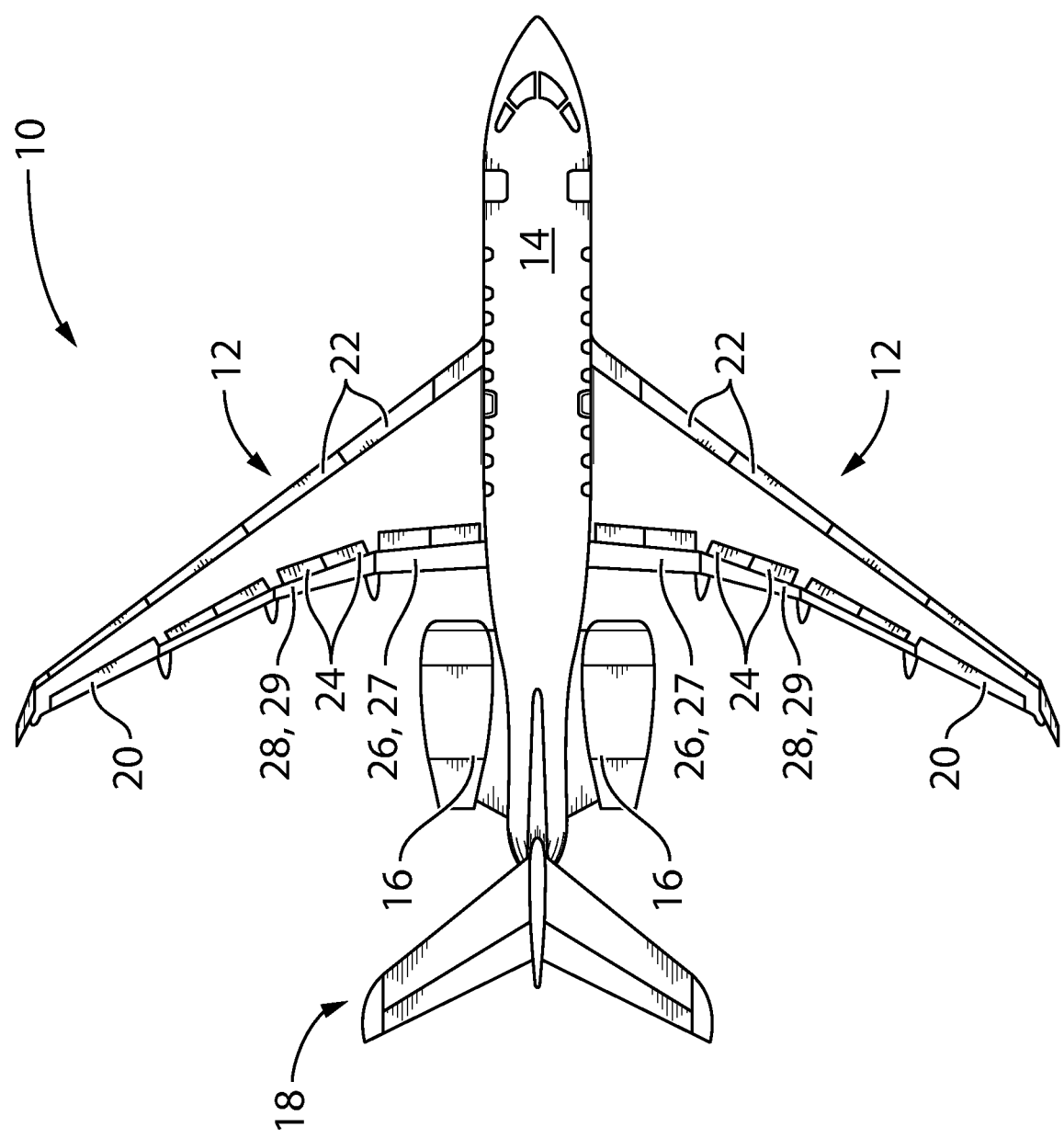
FIG. 1 is a top plan view of an exemplary aircraft comprising a flap system as disclosed herein.

FIG. 1 is a top plan view of an exemplary aircraft 10 which may comprise a trailing edge flap system as disclosed herein. Aircraft 10 may be any type of aircraft such as corporate (e.g., business jet), private, commercial and passenger aircraft. For example, aircraft 10 may be a narrow-body, twin-engine jet airliner. Aircraft 10 may be a fixed-wing aircraft. Aircraft 10 may comprise one or more wings 12, fuselage 14, one or more engines 16 and empennage 18 of known or other type. One or more of engines 16 may be mounted to fuselage 14. Alternatively, or in addition, one or more of engines 16 may be mounted to wings 12 or otherwise mounted to aircraft 10. Wings 12 may each include one or more flight control surfaces such as aileron(s) 20, leading edge slat(s) 22, spoiler(s) 24 and trailing edge flap(s) 26, 28. Leading edge slats 22 and trailing edge flaps 26, 28 may be considered "high-lift" flight control surfaces that may be deployed to increase the amount of lift generated by wings 12 during landing, take-off and/or during any other appropriate phases of flight or conditions requiring increased lift. One or more trailing edge flaps 26, 28 may be disposed at or near a trailing edge of each wing 12 and may define at least a portion of a trailing edge of each wing 12.

Inboard trailing edge flaps 26 may be disposed inboard of outboard trailing edge flaps 28 in relation to wing 12 and are referred hereinafter in the singular as "inboard flap 26". In some embodiments, inboard flap 26 may be disposed in an inboard section of wing 12 also known as a "Yehudi" section of wing 12. Outboard trailing edge flaps 28 may be disposed outboard of inboard trailing edge flaps 26 and are referred hereinafter in the singular as "outboard flap 28". References made herein to "inboard" and "outboard" are made in to indicate relative positioning along the span of wings 12 with respect to fuselage 14 where "inboard" is understood to mean toward a root of wing 12 and "outboard" is understood to mean toward a tip of wing 12.

A trailing edge of wing 12 may have a varying sweep angle along the span of wing 12 relative to a longitudinal axis of fuselage 14. For example, an inboard trailing edge portion of wing 12 defined by inboard flap 26 may be less swept than an outboard trailing edge portion of wing 12 defined by outboard flap 28. Accordingly, the trailing edge portion of wing 12 defined by inboard flap 26 may be non-parallel to the trailing edge portion of wing 12 defined by outboard flap 28.

As explained below, inboard flap 26 may be part of an inboard flap assembly 27 that has a lower stiffness than an outboard flap assembly 29 to which outboard flap 28 may be part of. For example, in some embodiments, inboard flap 26 may be a double-slotted flap of known or other type and outboard flap 28 may be a single-slotted flap of known or other type. The different types of actuation mechanisms associated with the deployment and/or retraction of single-slotted outboard flap 28 and double-slotted inboard flap 26 may contribute toward the difference in stiffness between outboard flap assembly 29 and inboard flap assembly 27. It is understood that aspects of this disclosure are also applicable to configurations where outboard flap assembly 29 would have a lower stiffness than inboard flap assembly 27.

The term "stiffness" as used herein is intended to represent a resistance to deformation of an elastic body in response to an applied force. For an elastic body with a single degree of freedom for example, a stiffness k may be represented as "k=F/δ" where "F" is the force applied on the body and "δ" is the displacement produced by the force along the same degree of freedom. Therefore, higher and lower stiffnesses are intended to represent higher and lower resistances to deformation respectively. In relation to flap assemblies 27, 29, stiffness may represent the resistance to displacement of inboard flap 26 and outboard flap 28 respectively along one or more degrees of freedom when subjected to an aerodynamic load.

The term "adjacent" as used herein in relation to the relationship between inboard flap 26 and outboard flap 28 is intended to encompass a proximal relative positioning of inboard flap 26 and outboard flap 28 such that, even though they may not contact each other, they are disposed immediately next to each other without any intermediate spacer(s) or other fixed surface(s) disposed between them.

Figure 2:
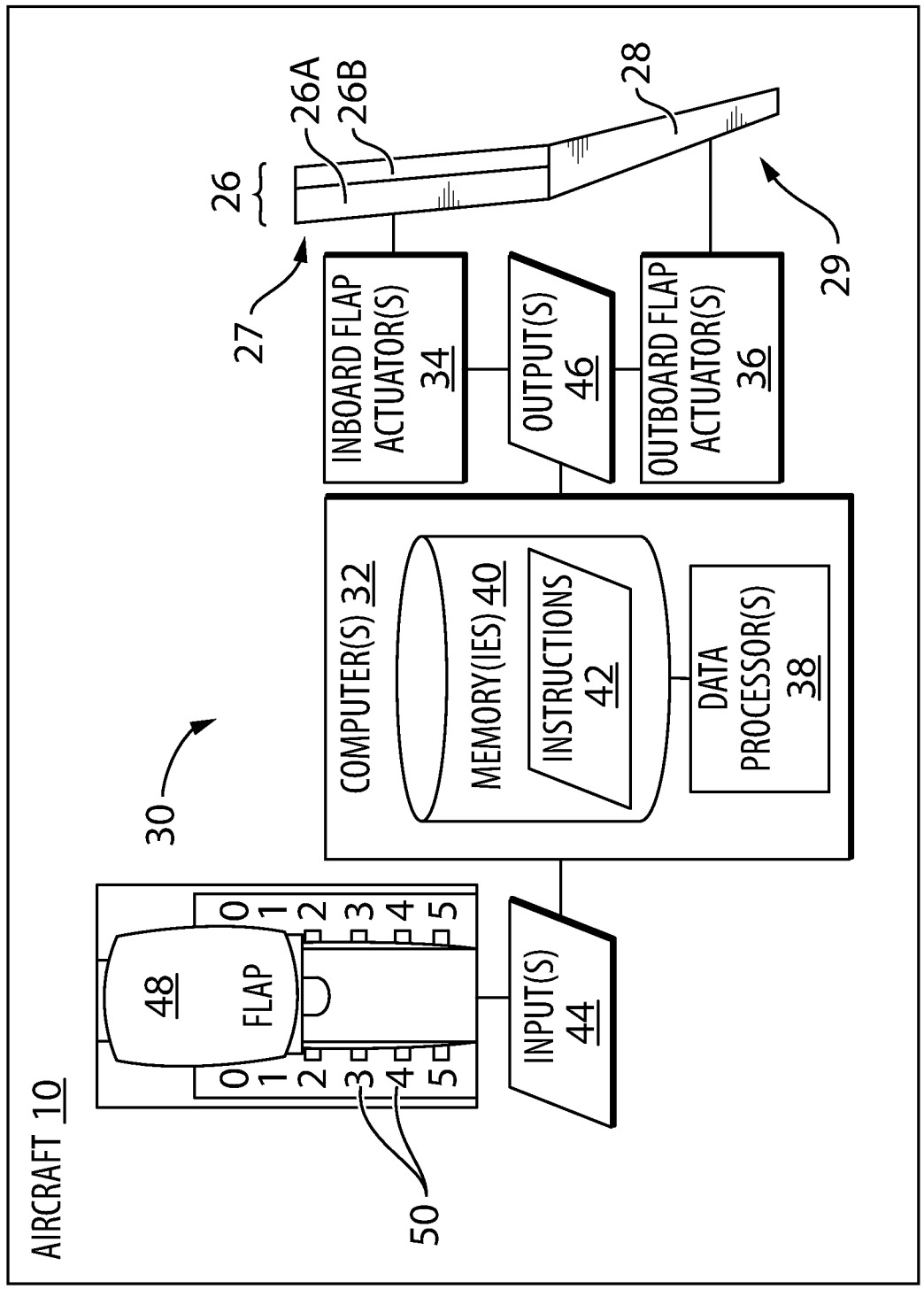
FIG. 2 is a schematic representation of an exemplary flap system as disclosed herein.

FIG. 2 is a schematic representation of an exemplary flap system 30 of aircraft 10 as disclosed herein. Flap system 30 may permit the deployment of adjacent inboard flap 26 and outboard flap 28 in a manner that improves spanwise flap continuity between inboard flap 26 and outboard flap 28 even though inboard flap 26 and outboard flap 28 may be part of flap assemblies 27, 29 of different stiffnesses. In some embodiments, inboard flap 26 and outboard flap 28 may be of different types (e.g., double-slotted and single-slotted). Accordingly, the use of flap system 30 may improve the spanwise flap continuity between inboard double-slotted flap 26 and adjacent outboard single-slotted flap 28 when flaps 26 and 28 are deployed together. It is understood that the use of flap system 30 is not limited to single-slotted flaps and double-slotted flaps and could be used with flaps of other types. For example, in some embodiments, flap system 30 may be used to improve the spanwise continuity between adjacent flaps of any known or other types that may be part of flap assemblies of different stiffnesses.

Double-slotted inboard flap 26 may comprise first panel 26A and second panel 26B movable relative to first panel 26A. First panel 26A may comprise a forward panel of double-slotted flap 26 and second panel 26B may comprise an aft panel of double-slotted flap 26. In some embodiments, first panel 26A may define a larger surface area for interacting with the air than second panel 26B. For example, first panel 26A may have a longer chord length than second panel 26B in some embodiments. Alternatively, in some embodiments, first panel 26A may define a smaller surface area for interacting with the air than second panel 26B.

As shown schematically in FIG. 2, flap system 30 may, in some embodiments, comprise inboard flap actuators 34 (referred hereinafter in the singular) and to outboard flap actuators 36 (referred hereinafter in the singular) respectively associated with inboard flap 26 and outboard flap 28. Inboard flap actuator 34 and outboard flap actuator 36 may be of known or other types and may, for example, comprise one or more hydraulic actuators, one or more electric actuators or both one or more hydraulic actuators and one or more electric actuators.

Even though FIG. 2 only shows a single inboard flap 26 and a single outboard flap 28 from one of wings 12, it is understood that flap system 30 may comprise additional flaps including inboard flap(s) 26 and outboard flap(s) 28 from the counterpart wing 12 on the opposite side of fuselage 14. In some embodiments of flap system 30, inboard flap actuator 34 and outboard flap actuator 36 may be used to separately or simultaneously actuate inboard flap 26 and outboard flap 28. However, in some embodiments, inboard flap 26 and outboard flap 28 may be actuated by one or more common actuators.

Flap system 30 may be disposed onboard of aircraft 10 and may comprise one or more computers 32 (referred hereinafter in the singular) operatively coupled to inboard flap actuator 34 and to outboard flap actuator 36. It is understood that computer 32 may be directly or indirectly (e.g., via intermediate device(s)) operatively coupled to inboard flap actuator 34 and outboard flap actuator 36 so as to impart some control over the operation of inboard flap 26 and outboard flap 28. Computer 32 may comprise one or more data processors 38 (referred hereinafter in the singular) of known or other type and which may be used to perform methods disclosed herein in entirety or in part. In some embodiments, methods disclosed herein may be performed using a single data processor 38 or, alternatively, parts of the methods disclosed herein could be performed using multiple data processors 38. Computer 32 may comprise machine-readable memory 40 storing instructions 42 executable by data processor 38 and configured to cause data processor 38 to carry out one or more tasks associated with the deployment and optionally the retraction of inboard flap 26 and of outboard flap 28 during operation (e.g., flight) of aircraft 10.

For example, computer 32 may receive input(s) 44 in the form of data or information that may be processed by data processor 38 based on instructions 42 in order to generate output 46. For example, input 44 may comprise information (data) representative of a commanded flap deployment amount (e.g., flap setting). In some embodiments, input 44 may comprise one or more signals representative of an input received from a pilot of aircraft 10 via input device 48 for example. Input device 48 may be of the type known as "flap selector" typically used by a pilot to command a flap deployment amount. For example, input device 48 may be used by a pilot to select a particular flap setting represented by tick marks 50 suitable for the particular phase of flight of aircraft 10. Alternatively, input 44 may be provided (e.g., automatically) by another computer or control system of aircraft 10. Alternatively, input 44 could also be produced/derived within computer 32 and subsequently used by data processor 38. Input 44 may be representative of a commanded deployment amount for inboard flap 26 and/or outboard flap 28.

Computer 32 may be part of an avionics suite of aircraft 10. For example, in some embodiments, computer 32 may carry out additional functions than those described herein. In some embodiments, flap system 30 may be part of a fly-by-wire control system of known or other type for aircraft 10.

Data processor 38 may comprise any suitable device(s) configured to cause a series of steps to be performed by computer 32 so as to implement a computer-implemented process such that instructions 42, when executed by computer 32, may cause the functions/acts specified in the methods described herein to be executed. Data processor 38 may comprise, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 40 may comprise any suitable known or other machine-readable storage medium. Memory 40 may comprise non-transitory computer readable storage medium such as, for example, but not limited to, an electronic, magnetic, optical, electromagnetic, infrared, or semiconductor system, apparatus, or device, or any suitable combination of the foregoing. Memory 40 may include a suitable combination of any type of computer memory that is located either internally or externally to computer 32. Memory 40 may comprise any storage means (e.g. devices) suitable for retrievably storing machine-readable instructions 42 executable by data processor 38.

Various aspects of the present disclosure may be embodied as systems, devices, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) (e.g., memory 40) having computer readable program code (e.g., instructions 42) embodied thereon. The computer program product may, for example, be executed by computer 32 to cause the execution of one or more methods disclosed herein in entirety or in part.

Computer program code for carrying out operations for aspects of the present disclosure in accordance with instructions 42 may be written in any combination of one or more programming languages, including an object oriented programming language such as Java, Smalltalk, C++ or the like and conventional procedural programming languages, such as the "C" programming language or other programming languages. Such program code may be executed entirely or in part by computer 32 or other data processing device(s). It is understood that, based on the present disclosure, one skilled in the relevant arts could readily write computer program code for implementing the methods disclosed herein.

In various embodiments, and as explained further below, instructions 42 may be configured to cause data processor 38 to: using data representative of a flap deployment command (e.g., input 44), generate output(s) 46 (referred hereinafter in the singular) for causing deployment of inboard flap 26 by a first deployment amount via inboard flap actuator 34, and, for causing deployment of outboard flap 28 by a second deployment amount via outboard flap actuator 36 where the first deployment amount of inboard flap 26 is greater than the second deployment amount of outboard flap 28. Alternatively, if inboard flap assembly 27 has a greater stiffness than outboard flap assembly 29, output 46 from computer 32 may be configured to cause the deployment amount of outboard flap 28 to be greater than the deployment amount of inboard flap 26. The differential deployment of inboard flap 26 and outboard flap 28 may be done to compensate for a difference in stiffness between inboard flap assembly 27 and outboard flap assembly 29 in order to improve spanwise flap continuity when inboard flap 26 and outboard flap 28 are deployed.

In various embodiments, input 44 may comprise other data including one or more operating parameters associated with aircraft 10. For example, input 44 may comprised sensed data associated with one or more systems of aircraft 10. For example, input 44 may comprise an operating parameter of aircraft 10 that may be indicative of an expected aerodynamic load or deflection on one or both of inboard flap 26 and outboard flap 28. Such operating parameter may be used by computer 32 to determine a suitable deployment amount for one or both of inboard flap 26 and outboard flap 28 based on the deflection(s) expected under such aerodynamic load. Accordingly, the deployment amount(s) for inboard flap 26 and/or outboard flap 28 may be variable based on (e.g., as a function of) the operating parameter. In some embodiments, the operating parameter may, for example, comprise an airspeed of aircraft 10. In some embodiments, the operating parameter may, for example, comprise a (e.g., substantially real-time) measured deflection of inboard flap 26 and/or of outboard flap 28.

Figure 3A:
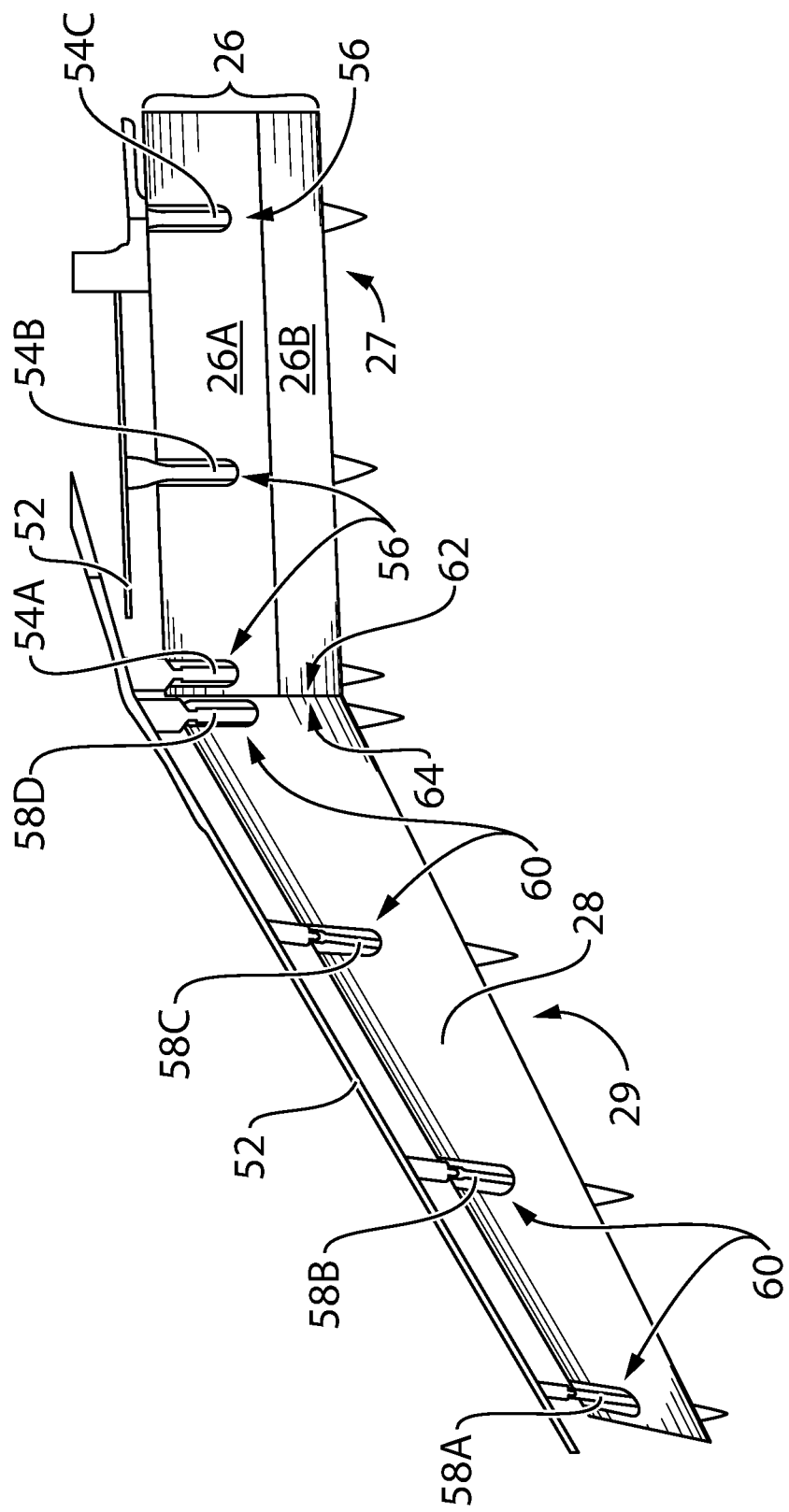
FIG. 3A is a top plan view of an inboard flap and an outboard flap of the flap system of FIG. 2 in a retracted position.
Figure 3B:
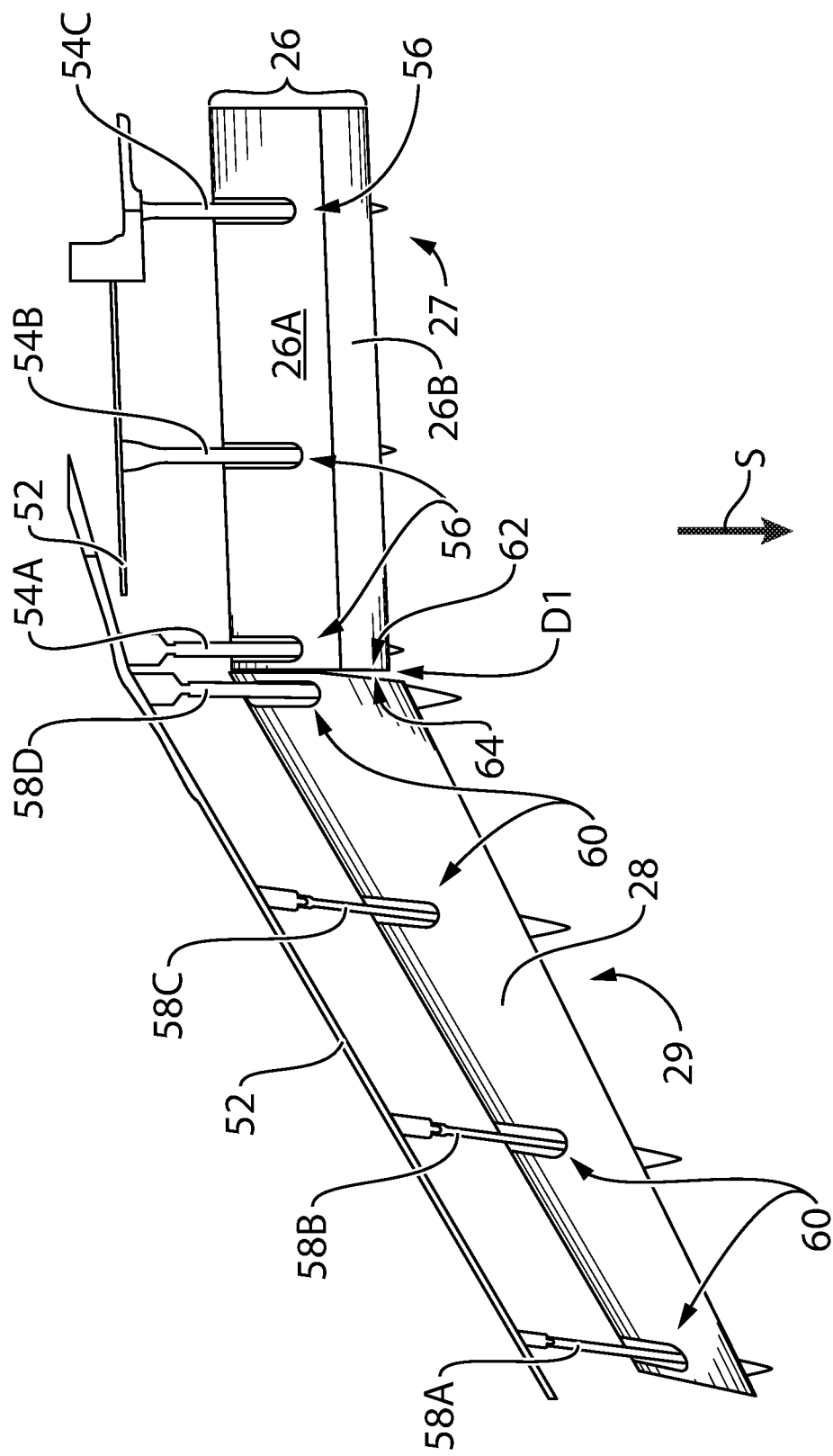
FIG. 3B is a top plan view of the inboard flap and the outboard flap of FIG. 3A in a deployed position.

FIG. 3A is a top plan view of inboard flap 26 and outboard flap 28 of flap system 30 in a retracted position and FIG. 3B is a top plan view of inboard flap 26 and outboard flap 28 in a deployed position. In reference to FIG. 3A, inboard flap 26 and outboard flap 28 may each be movably coupled to one or more structural elements 52 of wing 12. Structural element(s) 52 may, for example, comprise a spar of wing 12 or any other suitable structure.

Inboard flap 26 may be movably coupled to structural element 52 via one or more inboard tracks 54A-54C and associated carriages (not shown) or other coupling means of known or other types. Inboard tracks 54A-54C may guide the deployment and retraction of inboard flap 26. Inboard tracks 54A-54C may be considered part of inboard flap assembly 27 and may contribute to an overall stiffness of inboard flap assembly 27. Inboard tracks 54A-54C may be at least partially embedded in inboard flap 26 so that at least part of inboard tracks 54A-54C may be received into inboard flap 26 via cut-outs 56 formed in inboard flap 26 so that an overall height/thickness of inboard flap assembly 27 may be reduced.

Similarly, outboard flap 28 may be movably coupled to structural element 52 via one or more outboard tracks 58A-58D and associated carriages (not shown) or other coupling means of known or other types. Outboard tracks 58A-58D may guide the deployment and retraction of outboard flap 28. Outboard tracks 58A-58D may be considered part of outboard flap assembly 29 and may contribute to an overall stiffness of outboard flap assembly 29. Outboard tracks 58A-58D may be at least partially embedded in outboard flap 28 so that at least part of outboard tracks 58A-58D may be received into inboard flap 28 via cut-outs 60 formed in outboard flap 28 so that an overall height/thickness of outboard flap assembly 29 may also be reduced.

Outboard flap 28 may be adjacent inboard flap 26 so that no intermediate (e.g., pie-shaped) spacer or other fixed surface(s) may be disposed between outboard flap 28 and inboard flap 26. Even though outboard flap 28 and inboard flap 26 may be adjacent, they may not necessarily contact each other when they are retracted, deployed or during deployment or retraction. For example, a relatively narrow gap may be disposed between outboard flap 28 and inboard flap 26 to permit actuation of outboard flap 28 and inboard flap 26 without interference with each other. For example, in some embodiments, outboard edge 62 of inboard flap 26 and inboard edge 64 of outboard flap 28 may be substantially parallel when outboard flap 28 and inboard flap 26 are substantially retracted as viewed from a top view of wing 12 as shown in FIG. 3A.

In reference to FIG. 3B, inboard flap 26 and outboard flap 28 may be configured for generally streamwise deployment relative to aircraft wing 12 (e.g., see arrow "S"). For example, inboard tracks 54A-54C may be oriented to permit streamwise deployment of inboard flap 26. Similarly, tracks 58A-58D may be oriented to permit streamwise deployment of outboard flap 28. In some embodiments, an actuation mechanism of outboard flap assembly 29 may be configured to cause outboard flap 28 to undergo a conical movement when being deployed in the streamwise direction.

Due at least in part to their different constructions (e.g., different types of flaps, different actuation mechanisms), inboard flap assembly 27 and outboard flap assembly 29 may have different stiffnesses. For example, inboard flap assembly 27 including double-slotted inboard flap 26 may have a lower stiffness than outboard flap assembly 29 including single-slotted outboard flap 28. FIG. 3B shows inboard flap 26 and outboard flap 28 being in a substantially fully deployed configuration in a situation where little to no aerodynamic load is applied to inboard flap 26 and outboard flap 28 for the purpose of illustration only. For example, such situation may correspond to aircraft 10 being stationary or moving at relatively low speed on the ground. Under this "no-load" condition, gap D1 is formed between inboard flap 26 and outboard flap 28 when they are deployed. However, as explained below, when an aerodynamic load is applied to inboard flap assembly 27 and outboard flap assembly 29, gap D1 may be significantly reduced and spanwise flap continuity between inboard flap 26 and outboard flap 28 may be improved.

Figure 4B:
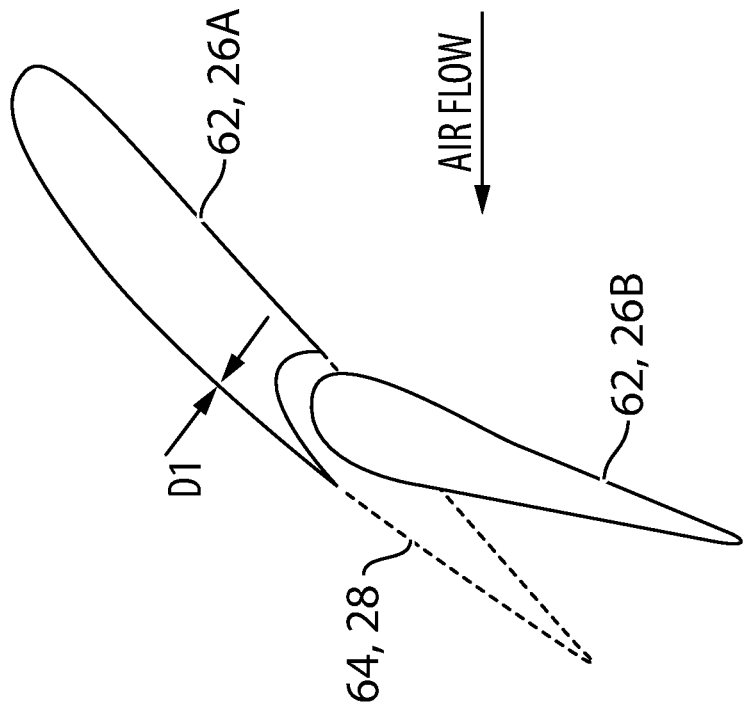
FIG. 4B shows a schematic representation of the outboard edge of the double-slotted inboard flap together with the adjacent inboard edge of the single-slotted outboard flap deployed by the same amounts as shown in FIG. 4A but in a situation where the inboard flap and the outboard flap are under an aerodynamic load.
Figure 4A:
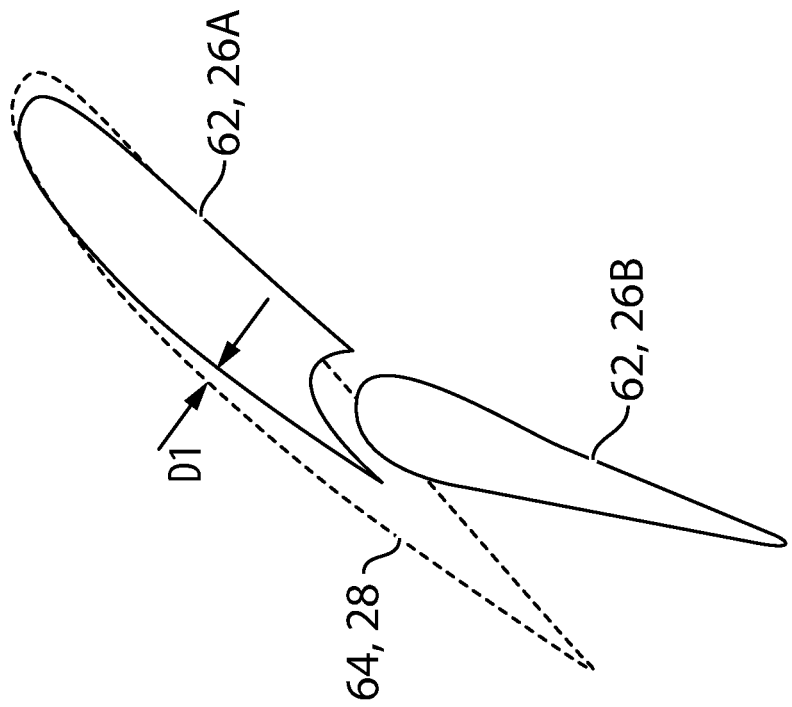
FIG. 4A shows a schematic representation of an outboard edge of the inboard double-slotted flap and an adjacent inboard edge of the outboard single-slotted flap of FIGS. 3A and 3B in a deployed configuration and in a no-load condition.

FIG. 4A shows a schematic representation of outboard edge 62 of inboard flap 26 together with adjacent inboard edge 64 of outboard flap 28 in a deployed configuration and in a no-load condition. In this example, inboard flap 26 is deployed by a greater amount (i.e., to a different deployed position) than outboard flap 28. For example, for a given flap setting commanded via flap selector 48 (shown in FIG. 2), computer 32 (shown in FIG. 2) may cause outboard flap 28 to be deployed to a 30-degree position and also cause inboard flap to be deployed to a 33-degree position. As shown in FIG. 4A, the differential deployment of inboard flap 26 and outboard flap 28 may, under little to no aerodynamic load, cause some spanwise discontinuity represented by gap D1 between inboard edge 64 of outboard flap 28 and outboard edge 62 of forward flap panel 26A of inboard flap 26.

FIG. 4B shows a schematic representation of outboard edge 62 of inboard flap 26 together with adjacent inboard edge 64 of outboard flap 28 being deployed by the same amounts shown in FIG. 4A but in a situation where inboard flap 26 and outboard flap 28 are under an aerodynamic load due to the influence of a flow of air (see arrow labelled "AIR FLOW" in FIG. 4B) when aircraft 10 is in flight for example. Since inboard flap assembly 27 has a lower stiffness than outboard flap assembly 29 in the illustrated example, the aerodynamic load applied to inboard flap 26 and outboard flap 28 may cause inboard flap 26 to deflect by a greater amount than outboard flap 28 under the influence of the flow of air. As shown in FIG. 4B, the difference in deflection between inboard flap 26 and outboard flap 28 may cause the size of gap D1 to be reduced and improve flap continuity during flight despite the difference in deployment amounts between inboard flap 26 and outboard flap 28. For the purpose of illustration, inboard edge 64 of outboard flap 28 and outboard edge 62 of first panel 26A of inboard flap 26 are shown as being superimposed.

In some embodiments, the greater deployment amount of inboard flap 26 may be adapted to at least partially compensate for a greater deflection of inboard flap 26 when inboard flap 26 is deployed and subjected to an aerodynamic load. For example, a difference in commanded deployment between the commanded deployment of inboard flap 26 and the commended deployment of outboard flap 28 may be adapted to at least partially compensate for a greater deflection of inboard flap 26 in order to improve spanwise continuity between inboard flap 26 and outboard flap 28 when inboard flap 26 and outboard flap 28 are deployed and subjected to an aerodynamic load as shown in FIG. 4B. For example, the difference in deployment amounts may be based on predetermined amounts of deflection of both inboard flap 26 and of outboard flap 28 under a predetermined aerodynamic load.

In some embodiments, output 36 from computer 32 may be representative of different individual commanded deployment amounts/positions for inboard flap 26 and outboard flap 28 that are either predetermined (e.g., from a look-up table) based on a commanded flap setting (e.g., via flap selector 48 in FIG. 2), or, that are determined based on one or more operating parameters (e.g., airspeed, measured deflection of a flap) of aircraft 10 and on the commanded flap setting.

Alternatively, output 46 from computer 32 may not be representative of differential deployment between inboard flap 26 and outboard flap 28. For example, such differential deployment may instead be built into inboard flap assembly 27 and outboard flap assembly 29 so that differential deployment may be achieved automatically (passively) irrespective of output 46 from computer 32. For example, in the embodiment illustrated in FIGS. 3A and 3B, inboard tracks 54A-54C may be configured differently (e.g., be longer or define different guide path(s)) from outboard tracks 58A-58D so that a generic deployment command generated by computer 32 via output 46 may result in inboard flap 26 and outboard flap 28 being deployed to different respective positions by virtue of the different mechanical arrangements of inboard flap assembly 27 and outboard flap assembly 29. In other words, the differential deployment of inboard flap 26 and outboard flap 28 used to compensate for the differential deflection of inboard flap assembly 27 and outboard flap assembly 29 under load may be built into the design of inboard flap assembly 27 and outboard flap assembly 29 based on expected aerodynamic loads and associated deflections during operation of aircraft 10. Such expected aerodynamic loads and associated deflections may be determined empirically or by numerical modelling. Accordingly, a deployed position of inboard flap 26 may be adapted to compensate for an expected deflection of inboard flap assembly 27 under an aerodynamic load to improve continuity between inboard flap 26 and outboard flap 28 when inboard flap 26 and outboard flap 28 are deployed in response to a generic flap deployment command.

Figure 5B:
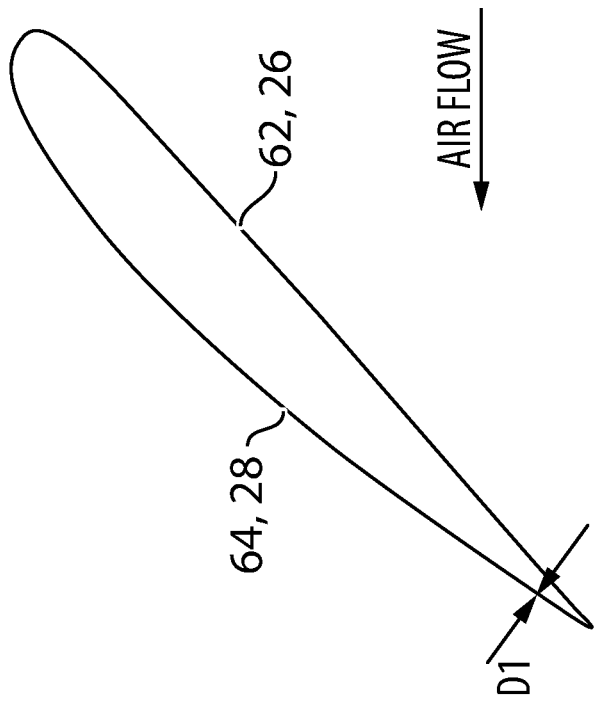
FIG. 5B shows a schematic representation of the outboard edge of the inboard flap together with the adjacent inboard edge of the outboard flap of FIG. 5A deployed by the same amounts as shown in FIG. 5A but in a situation where the inboard flap and the outboard flap are under an aerodynamic load.
Figure 5A:
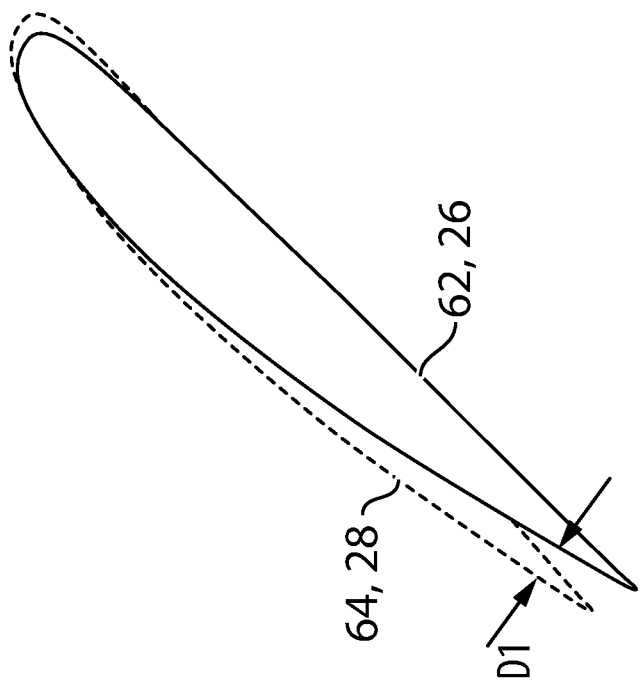
FIG. 5A shows a schematic representation of an outboard edge of an exemplary single-slotted inboard flap together with an adjacent inboard edge of an exemplary single-slotted outboard flap in a deployed configuration and in a no-load condition.

FIGS. 5A and 5B are analogous to FIGS. 4A and 4B respectively except where inboard flap 26 is single-slotted and outboard flap 28 is also single-slotted. Aspects described above in relation to FIGS. 4A and 4B are also applicable to FIGS. 5A and 5B. FIG. 5A shows a schematic representation of outboard edge 62 of inboard flap 26 together with adjacent inboard edge 64 of outboard flap 28 in a deployed configuration and in a no-load condition where inboard flap 26 is deployed by a greater amount (i.e., to a different deployed position) than outboard flap 28. FIG. 5B shows a schematic representation of outboard edge 62 of inboard flap 26 together with adjacent inboard edge 64 of outboard flap 28 being deployed by the same amounts shown in FIG. 5A but in a situation where inboard flap 26 and outboard flap 28 are under an aerodynamic load due to the influence of a flow of air (see arrow labelled "AIR FLOW" in FIG. 5B) when aircraft 10 is in flight for example. For the purpose of illustration, inboard edge 64 of outboard flap 28 and outboard edge 62 of inboard flap 26 are shown as being superimposed in FIG. 5B.

Figure 6B:
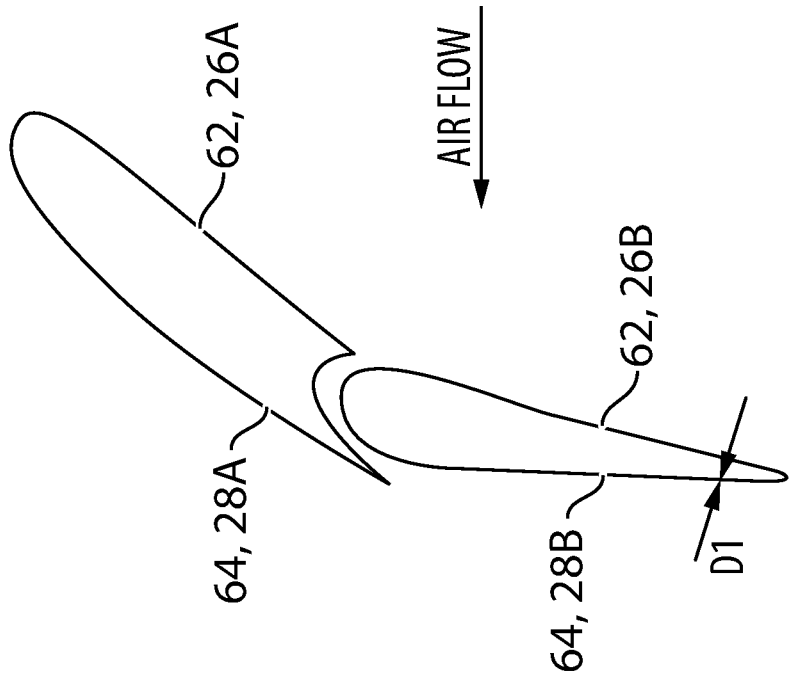
FIG. 6B shows a schematic representation of the outboard edge of the inboard flap together with the adjacent inboard edge of the outboard flap of FIG. 6A deployed by the same amounts as shown in FIG. 6A but in a situation where the inboard flap and the outboard flap are under an aerodynamic load.
Figure 6A:
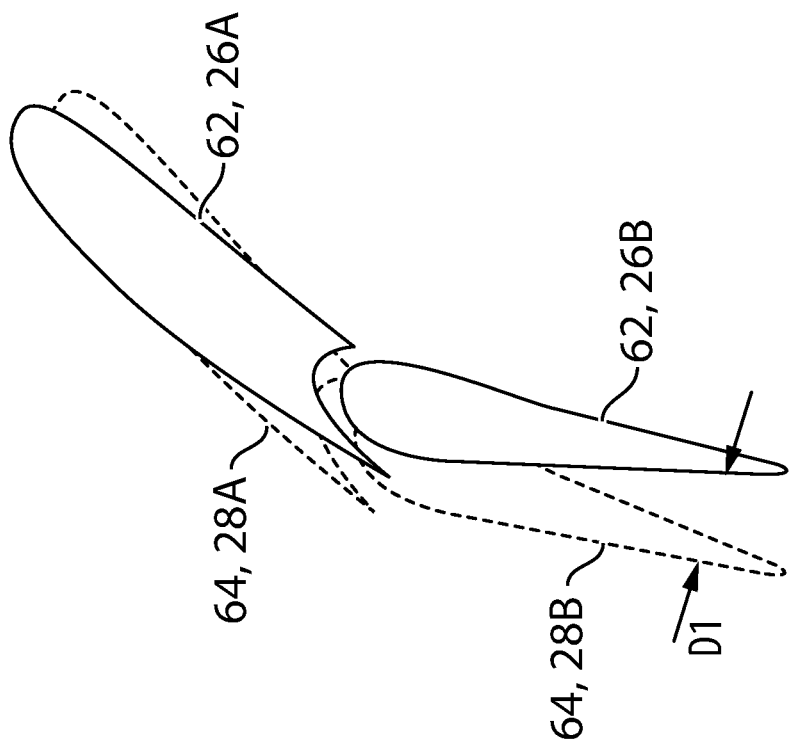
FIG. 6A shows a schematic representation of an outboard edge of an exemplary double-slotted inboard flap together with an adjacent inboard edge of an exemplary double-slotted outboard flap in a deployed configuration and in a no-load condition.

FIGS. 6A and 6B are analogous to FIGS. 4A and 4B respectively except where inboard flap 26 is double-slotted and outboard flap 28 is also double-slotted. Aspects described above in relation to FIGS. 4A and 4B are also applicable to FIGS. 6A and 6B. FIG. 6A shows a schematic representation of outboard edge 62 of inboard flap 26 together with adjacent inboard edge 64 of outboard flap 28 (i.e., first panel 28A and second panel 28B) in a deployed configuration and in a no-load condition where inboard flap 26 is deployed by a greater amount (i.e., to a different deployed position) than outboard flap 28. FIG. 6B shows a schematic representation of outboard edge 62 of inboard flap 26 together with adjacent inboard edge 64 of outboard flap 28 being deployed by the same amounts shown in FIG. 6A but in a situation where inboard flap 26 and outboard flap 28 are under an aerodynamic load due to the influence of a flow of air (see arrow labelled "AIR FLOW" in FIG. 6B) when aircraft 10 is in flight for example. For the purpose of illustration, inboard edge 64 of outboard flap 28 and outboard edge 62 of inboard flap 26 are shown as being superimposed in FIG. 6B.

Figure 7:
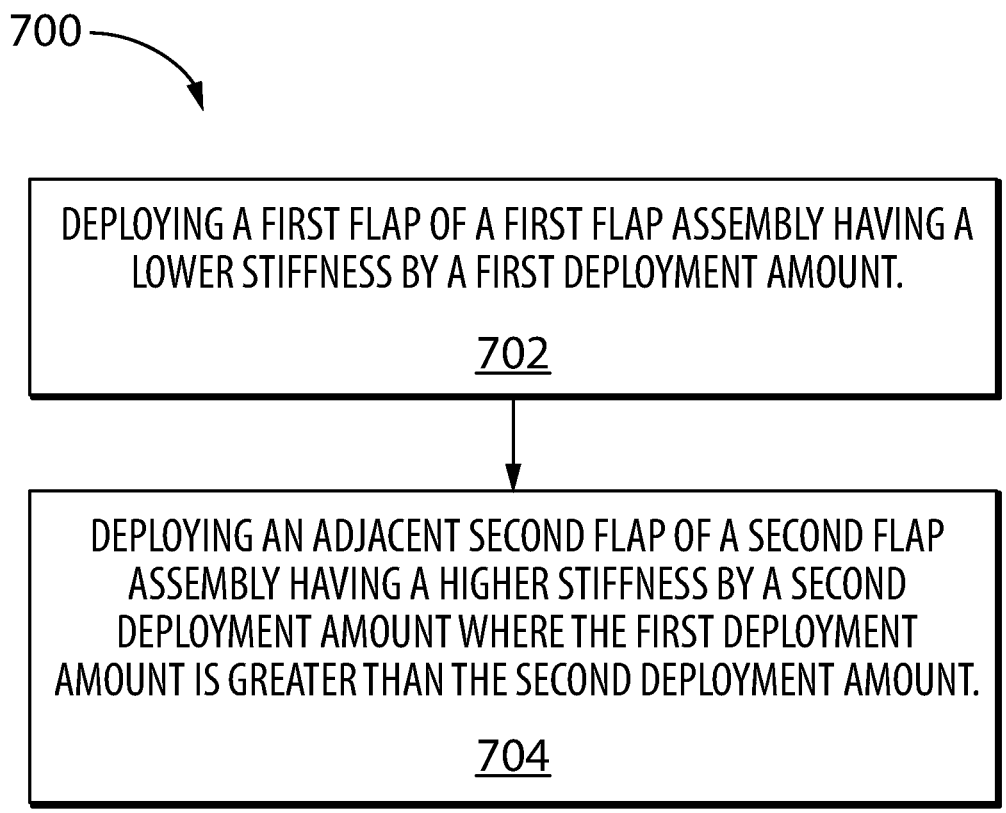
FIG. 7 is a flowchart illustrating an exemplary method for deploying adjacent trailing edge flaps of an aircraft wing.

FIG. 7 is a flowchart illustrating an exemplary method 700 for deploying adjacent trailing edge flaps 26, 28 movably coupled to wing 12 of aircraft 10 during flight where trailing edge flaps 26, 28 are part of different flap assemblies 27, 29 having different stiffnesses. Method 700 may be conducted with flap system 30 described above or with another suitable system. Accordingly, aspects of flap system 30 described above may also apply to method 700 and vice versa. In various embodiments, method 700 may comprise: deploying a first flap (e.g., inboard flap 26) of a first flap assembly (e.g., inboard flap assembly 27) having a first stiffness by a first deployment amount (see block 702); and deploying a second flap (e.g., outboard flap 28) adjacent the first flap by a second deployment amount where the second flap is part of a second flap assembly (e.g., outboard flap assembly 29) having a second stiffness, the first stiffness of the first flap assembly being lower than the second stiffness of the second flap assembly and the first deployment amount of the first flap being greater than the second deployment amount of the second flap (see block 704).

In some embodiments of method 700, the greater first deployment amount may be adapted to at least partially compensate for a deflection of the first flap assembly relative to the second flap assembly when the first flap is deployed and subjected to an aerodynamic load.

In some embodiments of method 700, a deployment difference between the first deployment amount and the second deployment amount may be adapted to improve continuity between the first flap and the second flap when the first flap and the second flap are deployed and subjected to an aerodynamic load.

In some embodiments of method 700, the first flap may be double-slotted and second flap may be single-slotted.

In some embodiments of method 700, the first flap may be disposed inboard of the second flap relative to wing 12 of aircraft 10.

In some embodiments of method 700, outboard edge 62 of the first flap and inboard edge 64 of the second flap may be substantially parallel when the first flap and the second flap are substantially retracted.

In some embodiments of method 700, a first trailing edge portion of wing 12 defined by the first flap may be non-parallel to a second trailing edge portion of wing 12 defined by the second flap.

In some embodiments of method 700, the second flap may be deployed in a generally streamwise direction relative to wing 12.

In some embodiments of method 700, the first flap and the second flap may be deployed simultaneously.

In some embodiments, method 700 may comprise determining the first deployment amount of the first flap based on an operating parameter (e.g., airspeed, measured deflection of a flap) of the aircraft.

FIG. 8 is a flowchart illustrating another exemplary method 800 for deploying adjacent trailing edge flaps 26, 28 movably coupled to wing 12 of aircraft 10 during flight where trailing edge flaps 26, 28 are part of different flap assemblies 27, 29 having different stiffnesses. Method 800 may be conducted with flap system 30 described above or with another suitable system. Accordingly, aspects of flap system 30 described above may also apply to method 800 and vice versa. In various embodiments, method 800 may comprise: deploying a first flap (e.g., inboard flap 26) of a first flap assembly (e.g., inboard flap assembly 27) having a first stiffness to a first deployed position in response to a flap deployment command (see block 802); and deploying a second flap (e.g., outboard flap 28) adjacent the first flap to a second deployed position in response to the flap deployment command where the second flap is part of a second flap assembly (e.g., outboard flap assembly 29) having a second stiffness, the first stiffness of the first flap assembly is lower than the second stiffness of the second flap assembly and the first deployed position of the first flap is adapted to compensate for an expected deflection of the first flap assembly under an aerodynamic load to improve continuity between the first flap and the second flap when the first flap and the second flap are deployed in response to the flap deployment command (see block 804).

In some embodiments of method 800, the first deployment position of the first flap is adapted to compensate for different expected deflections of the first flap assembly and of the second flap assembly.

In some embodiments of method 800, the first flap is double-slotted and second flap is single-slotted.

In some embodiments of method 800, the first flap is disposed inboard of the second flap relative to the aircraft wing 12. An outboard edge 62 of the first flap and an inboard edge 64 of the second flap may be substantially parallel when the first flap and the second flap are substantially retracted.

In some embodiments of method 800, a first trailing edge portion of the aircraft wing 12 defined by the first flap may be non-parallel to a second trailing edge portion of the aircraft wing 12 defined by the second flap.

In some embodiments, method 800 may comprise deploying the second flap in a generally streamwise direction relative to the aircraft wing 12.

In some embodiments, method 800 may comprise determining the first deployment position of the first flap based on an operating parameter (e.g., airspeed, measured deflection of a flap) of aircraft 10.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. The present disclosure may be embodied in other specific forms without departing from the subject matter of the claims. Also, one skilled in the relevant arts will appreciate that while the systems, assemblies and methods disclosed and shown herein may comprise a specific number of elements/components, the systems, assemblies and methods could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A trailing edge flap system for a wing of an aircraft, the system comprising:
    a first flap assembly including a first flap movably coupled to a structure of the aircraft wing, the first flap assembly having a first stiffness, the first flap assembly being configured to guide the first flap to a first deployed position based on a flap deployment command; and
    a second flap assembly including a second flap movably coupled to the structure of the aircraft wing, the second flap being disposed adjacent the first flap, the second flap assembly having a second stiffness, the first stiffness of the first flap assembly being lower than the second stiffness of the second flap assembly, the second flap assembly being configured to guide the second flap to a second deployed position based on the flap deployment command, the first deployed position of the first flap being adapted to compensate for an expected deflection of the first flap assembly under an aerodynamic load to improve continuity between the first flap and the second flap when the first flap and the second flap are deployed based on the flap deployment command.

2. The system as defined in claim 1, wherein the first deployment position of the first flap is adapted to compensate for different expected deflections of the first flap assembly and of the second flap assembly.

3. The system as defined in claim 1, wherein the first flap is double-slotted and second flap is single-slotted.

4. The system as defined in claim 1, wherein the first flap is disposed inboard of the second flap relative to the aircraft wing.

5. The system as defined in claim 4, wherein an outboard edge of the first flap and an inboard edge of the second flap are substantially parallel when the first flap and the second flap are substantially retracted.

6. The system as defined in claim 1, wherein a first trailing edge portion of the aircraft wing defined by the first flap is non-parallel to a second trailing edge portion of the aircraft wing defined by the second flap.

7. The system as defined in claim 1, wherein the second flap is configured for generally streamwise deployment relative to the aircraft wing.

8. The system as defined in claim 1, wherein:
    the first flap assembly comprises one or more first tracks for guiding the deployment of the first flap; and
    the second flap assembly comprises one or more second tracks for guiding the deployment of the second flap, the one or more first tracks and the one or more second tracks being at least partially embedded in the first flap and second flap respectively.

9. An aircraft comprising the system as defined in claim 1.

10. A method for deploying adjacent trailing edge flaps movably coupled to an aircraft wing during flight where the adjacent trailing edge flaps are part of different flap assemblies having different stiffnesses, the method comprising:
    deploying a first flap of a first flap assembly having a first stiffness to a first deployed position in response to a flap deployment command; and
    deploying a second flap adjacent the first flap to a second deployed position in response to the flap deployment command, the second flap being part of a second flap assembly having a second stiffness, the first stiffness of the first flap assembly being lower than the second stiffness of the second flap assembly and the first deployed position of the first flap being adapted to compensate for an expected deflection of the first flap assembly under an aerodynamic load to improve continuity between the first flap and the second flap when the first flap and the second flap are deployed in response to the flap deployment command.

11. The method as defined in claim 10, wherein the first deployment position of the first flap is adapted to compensate for different expected deflections of the first flap assembly and of the second flap assembly.

12. The method as defined in claim 10, wherein the first flap is double-slotted and second flap is single-slotted.

13. The method as defined in claim 10, wherein the first flap is disposed inboard of the second flap relative to the aircraft wing.

14. The method as defined in claim 13, wherein an outboard edge of the first flap and an inboard edge of the second flap are substantially parallel when the first flap and the second flap are substantially retracted.

15. The method as defined in claim 10, wherein a first trailing edge portion of the aircraft wing defined by the first flap is non-parallel to a second trailing edge portion of the aircraft wing defined by the second flap.

16. The method as defined in claim 10, comprising deploying the second flap in a generally streamwise direction relative to the aircraft wing.

17. The method as defined in claim 10, comprising determining the first deployment position of the first flap based on an operating parameter of the aircraft.

18. The method as defined in claim 10, comprising determining the first deployment position of the first flap based on an airspeed of the aircraft.

\* \* \* \* \*